Aug. 13, 1940.   W. GEYGER   2,210,936
APPARATUS FOR SIMULTANEOUSLY MEASURING TWO MAGNITUDES
THROUGH A COMMON LINE SECTION
Filed June 30, 1937   3 Sheets-Sheet 1

Inventor
Wilhelm Geyger
by Knight Bros
attorneys

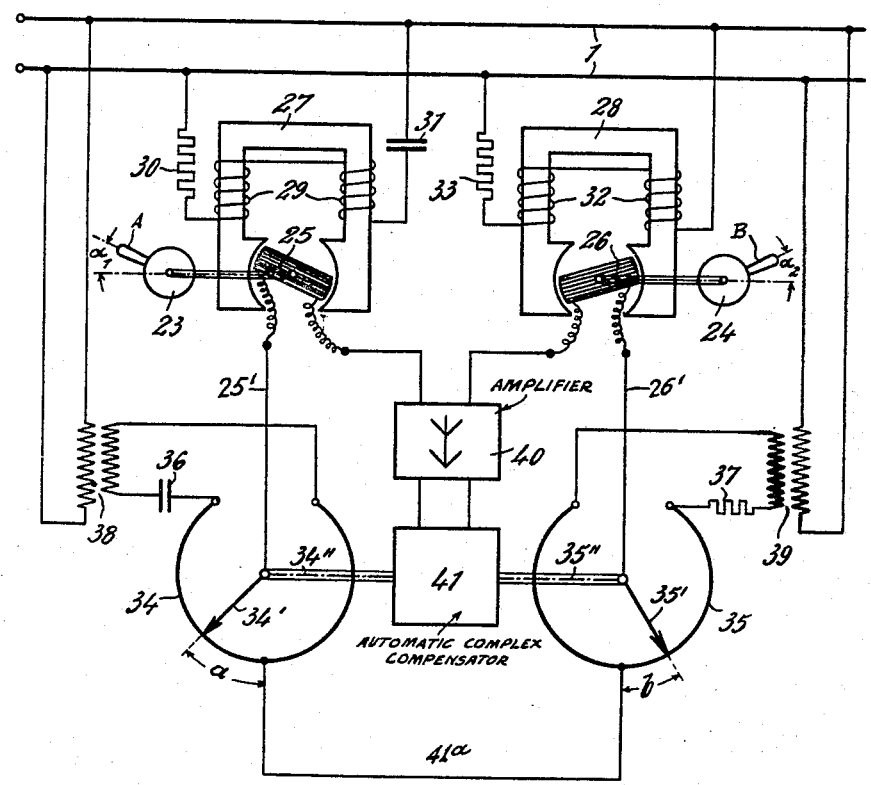

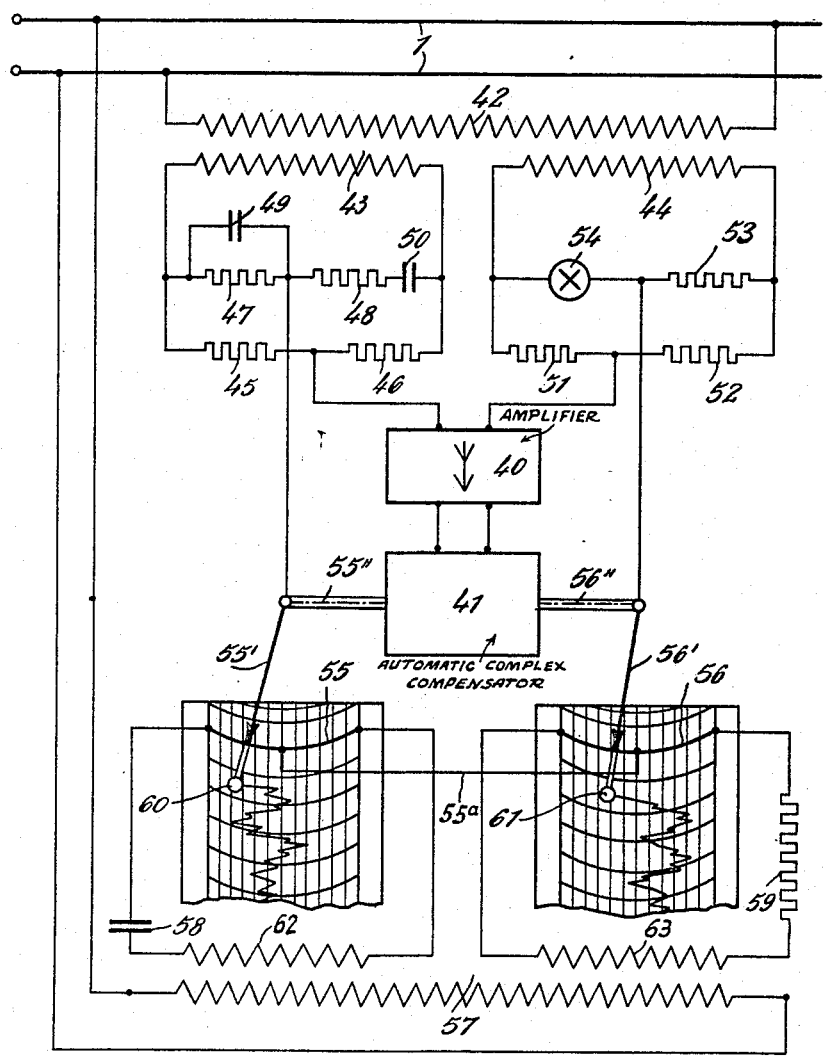

Patented Aug. 13, 1940

2,210,936

UNITED STATES PATENT OFFICE 2,210,936

APPARATUS FOR SIMULTANEOUSLY MEASURING TWO MAGNITUDES THROUGH A COMMON LINE SECTION

Wilhelm Geyger, Berlin-Schmargendorf, Germany, assignor to Siemens & Halske, Aktiengesellschaft, Siemensstadt, near Berlin, Germany, a corporation of Germany Application June 30, 1937, Serial No. 151,233
In Germany July 3, 1936

8 Claims. (Cl. 171—95)

My invention relates to an arrangement for simultaneously transmitting through a common line section and separately receiving two quantities which may be variable independently of each other.

If two quantities which may be varied independently of each other are electrically transmitted to be utilized at the receiving end in any manner, for instance, for controlling control devices, two separate line sections are generally necessary which extend to such control devices. However, it is often desirable to simultaneously transmit the several quantities through a common line, particularly in the case of considerable distances. But also in cases in which a long distance transmission is not involved the use of a common line section may be of a great economical importance, particularly if an amplification of the values of the quantities to be transmitted is necessary.

Various means have already been proposed which make possible the simultaneous transmission of a plurality of quantities through a common line section and their separate reception at the receiving end. The effect of these means is based as a rule on the idea of transmitting the several quantities with the aid of electric currents of different nature, particularly of different frequency, and of separating the different currents by suitable filtering means after flowing through the common line section and then supplying them to the corresponding receiving devices.

By the present invention it is possible to simultaneously transmit with the aid of a single electric current through a common line section, particularly through a common amplifier, two quantities which may be varied independently of each other. To this end two alternating voltages 90° out of phase are produced according to the invention with the aid of known means, each voltage being allotted to one of the quantities to be transmitted. These voltages are then combined to a resultant voltage which is supplied through a common line section to a receiving device which individually responds to either component of this voltage each independently of the other.

A receiving device capable of responding, for example, to the real component and to the imaginary component of an alternating voltage independently of each other is, for instance, a complex compensator. Such a device has at the same time the advantage that it permits a very accurate indication and—if designed with an automatic compensating device, particularly in connection with an amplifier also in the case of a very great sensitiveness—the separate recording of both transmitted quantities by inkers or permits the corresponding quantities to actuate by relay action control devices or the like which require a considerable amount of power to operate. According to the invention it is also possible to simultaneously transmit and amplify any two quantities to be transmitted through a common amplifier without the receiving instruments connected to the amplifier influencing each other.

In the accompanying drawings are shown some embodiments of my invention in diagrammatic form.

Fig. 3 shows an arrangement in which two angular positions are transmitted as quantities with the aid of adjustable mutual inductances which act on an automatic complex compensator through an amplifier.

Fig. 4 shows an arrangement for simultaneously recording the frequency and the voltage of an alternating current with the aid of two bridge connections whose diagonal voltages act through an amplifier on an automatic complex compensator controlling the recording device.

Figure 1:
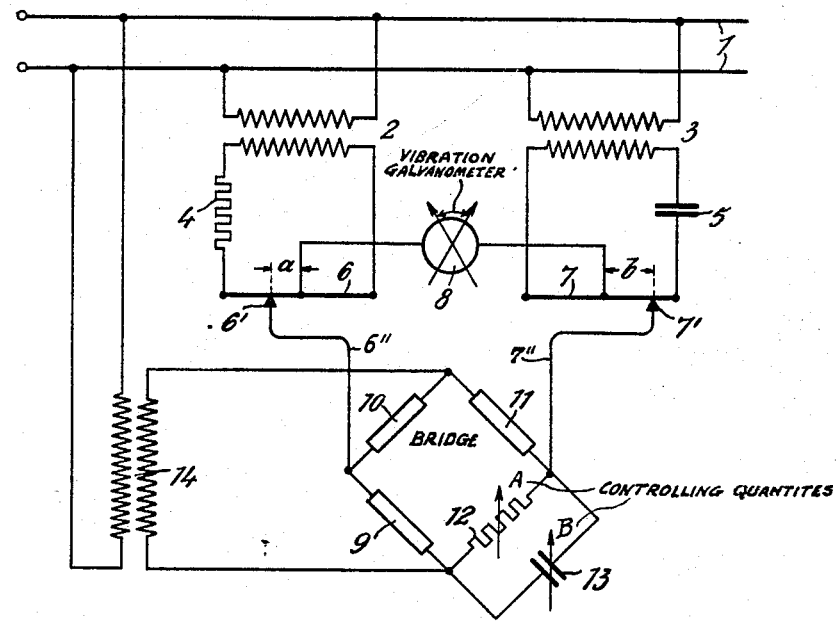
Fig. 1 shows a bridge connection in which for the production of the two voltages 90° out of phase an ohmic and a capacitive impedance, influenced by the quantities to be transmitted, are arranged in a branch of the bridge.

In Fig. 1 the primary windings of two transformers 2 and 3 are connected to the supply circuit 1. The secondary winding of the transformer 2 is connected through an ohmic resistance 4 to a slide wire 6 and the secondary winding of the transformer 3 to a slide wire 7 through a capacitor 5. The mid-points of the contact wires are connected through an electric measuring instrument; for instance, through a vibration galvanometer 8. The crossed arrows shown indicate symbolically the amplitude of the oscillations of this instrument. The contacts 6' and 7' movable along the slide wires are connected by the line wires 6", 7" to two diagonal points of the bridge connection, formed of three resistances 9, 10, 11 and of a fourth bridge branch comprising a regulable ohmic resistance 12 and a regulable capacitor 13 connected in parallel relation thereto. Otherwise the bridge arrangement is connected in the usual manner, for instance, by a transformer 14, to the alternating-current supply circuit 1.

Let us assume that two quantities A and B which are together with the bridge 9, 10, 11, 12, 13, located at a remote point from wires 6, 7, and which are indicated in Fig. 1 by the arrows A, B, are to be transmitted to the place where wires 6, 7 are located. If for this purpose, for instance, the quantity A is arranged to act by any suitable means to vary the regulable resistance 12 and the other quantity B varies the regulable capacitor 13, a voltage depending upon the value of each of the quantities is thereby produced, the voltages in question being 90° out of phase owing to the ohmic and capacitive nature of the impedances 12 and 13 respectively. In the bridge is a measure of the quantity A and whose imaginary component is a measure of the quantity B. Since the currents flowing through the slide wires 6 and 7 are 90° out of phase owing to the insertion of an ohmic resistance 4 and of a capacitor 5 respectively in the slide wire circuits, the contacts 6', 7' when displaced, until the vibration galvanometer 8 reads zero, the amounts of resistance of the slide wire lengths designated by $a$ and $b$ respectively and, therefore, also the wire section lengths $a$ and $b$ themselves are a measure of the ohmic and the capacitive component, i. e. also a measure of quantities A and B themselves respectively.

Figure 2:
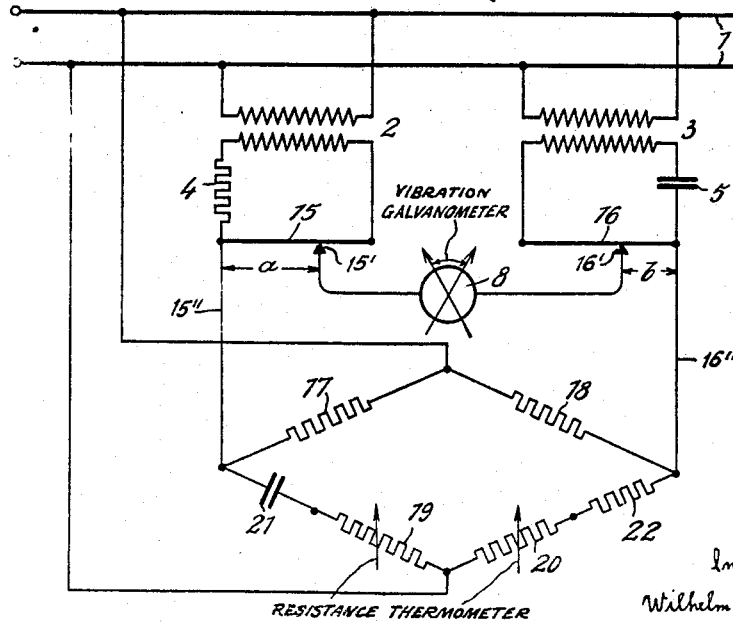
Fig. 2 shows a bridge connection for transmitting as quantities any two temperature values with the aid of distantly located resistance thermometers.

Also in the arrangement shown in Fig. 2, which shows the transmission of temperature values to a remote point, two circuits in which are inserted the slide wires 15 and 16 respectively are connected to the alternating-current supply circuit 1 through transformers 2 and 3, the currents being 90° out of phase owing to the insertion of an ohmic resistance 4 and the capacitor 5 respectively. Since in the case of resistance thermometers ohmic resistances are employed which are influenced by the temperature values to be transmitted it is not necessary that the indicating wires 15, 16 be tapped off from the mid-point such as 6, 7 in Fig. 1. The endpoints of the indicating wires are instead connected by the line wires 15'', 16'' to the diagonal points of a bridge connection which is fed with energy by the supply circuit 1. In two of the bridge branches are arranged respectively the ohmic resistances 17, 18 and in each of the other bridge branches a resistance thermometer 19 and 20 respectively, a capacitor 21 being series-connected to the resistance 19 and an ohmic resistance 22 series-connected to the resistance 20. The indicating instrument 8, designated preferably again in the form of a vibration galvanometer, is connected to both slide contacts 15' and 16'. Otherwise the bridge is fed with energy from the alternating-current supply circuit 1 in the usual manner.

By connecting in series the capacitor 21 and the ohmic resistance 22, voltages 90° out of phase are produced in the corresponding branches of the bridge so that the diagonal voltage transmitted through line wires 15'', 16'' constitutes a resultant of these voltages. By displacing the contacts 15', 16' the measure of both components of the resultant voltage is reproduced when the vibration galvanometer 8 indicates zero reading in the same manner as in the arrangement shown in Fig. 1—by the lengths of the sections $a$ and $b$ tapped off from the slide wires 15 and 16 and thus a measure of the temperatures to which resistances 19 and 20 have responded is obtained.

In Fig. 3, 23 and 24 denote two rotary instruments which may be adjusted to certain angles $\alpha_1$ and $\alpha_2$. The instruments 23 and 24 may be controlled by any two quantities A and B, for instance movements derived from some measuring instruments of any type not shown here, and which it is desired to transmit to a remote point. Each of the rotary instruments 23, 24 is coupled with a moving coil 25 and 26 respectively each coil moving within the field of an iron body 27 and 28 respectively. The field for the moving coil 25 is produced by an exciting winding 29 which is connected to the alternating-current supply circuit 1 through an ohmic resistance 30 and a capacitor 31. The field for the moving coil 26 is produced by an exciting winding 32 which is connected to the supply circuit 1 only through an ohmic resistance 33. The resistances are, therefore, so rated that the exciting currents and, therefore, also the fields in the iron bodies 27 and 29 are relatively 90° out of phase.

Both moving coils 25 and 26 are connected on the one hand in series through the primary circuit of an amplifier 40 and on the other hand to the contact arms 34' and 35' moving on the slide wires 34 and 35 of the remote indicating instruments. The slide wire 34 is connected to the supply circuit 1 through a capacitor 36 and the slide wire 35 through an ohmic resistance 37 by means of transformers 38 and 39 respectively. The mid-points of both slide wires are conductively connected to each other by conductor 41a. The output terminals of the amplifier 40 extend to the input terminals of an automatic complex compensator 41 which serves to automatically and individually adjust the contact arms 34' and 35'. Such an instrument is fully described and illustrated in my copending earlier application, Serial No. 98,886. To this end the instrument 41 may be provided, for instance, with two separately excited induction meter measuring mechanisms, such as shown at $M_1$, $M_2$ in Fig. 3 of the afore-mentioned application, serving at the same time as phase-responsive zero indicators and as reversing motors and driving in the present Fig. 3 each one of the contact arms 34' and 35' through the shafts 34'' and 35'' respectively, the same as the contact arms $K_1'$, $K_2'$ respectively are driven in Fig. 3 of my aforesaid application.

The alternating voltage produced in the moving coil 25 is dependent upon the angle $\alpha_1$ and, therefore, upon the quantity A to be transmitted. Also the voltage produced in the moving coil 26 is dependent upon the angle $\alpha_2$ i. e. upon the quantity B to be transmitted. Since the coil fields are 90° out of phase this applies also to the voltages produced in the moving coils. The voltage resulting from these two components owing to the series-connection of the moving coils is supplied to the aforementioned automatic complex compensator through the amplifier 40. The compensator operates in such a manner that each of the excited induction meter measuring mechanisms such as $M_1$, $M_2$, as described in my afore-mentioned application with reference to Fig. 3, and arranged in the instrument 41 of the present case and displaced 90° out of phase, for instance, by a phase advancer shown at Ph in Fig. 3 of said application and whose series-connected current windings are impressed with the resultant voltage—operates in response to one of the components and, therefore, automatically adjusts the contact arms 34' and 35' in such a manner that the corresponding lengths $a$ and $b$ of the slide wires correspond respectively to the two components and, therefore, respectively to angles $d_1$, $d_2$ and thus represent a measure of the quantities A and B to be transmitted.

In the arrangement shown in Fig. 4 for simultaneously recording as an example the frequency and the voltage of an alternating current the primary winding 42 of a transformer having two secondary windings 43 and 44 is connected to the alternating current energy supply circuit 1 to be investigated. The secondary winding 43 supplies a known frequency responsive bridge connection with energy and in which two ohmic resistances 45, 46 forming two bridge branches are connected to the terminals of the secondary transformer winding, whereas each of the other two branches of the bridge comprises an ohmic resistance 47 and 48 having respectively a parallel-connected capacitor 49 and a series-connected capacitor 50. The secondary winding 44 feeds a second bridge connection in which are inserted the ohmic resistances 51, 52, 53 and 54, of which at least one (54) is a voltage-responsive resistance.

The diagonal voltages of the two bridge connections are series-connected in the manner as shown in the drawings through slide wires 55, 56, a conductor 55a connecting the mid-points of the slide wires and through the input circuit of an amplifier 40. The slide wires 55, 56 are located in two individual circuits, one including wire 55, capacity 58 and the transformer secondary 62, and the other including wire 56, ohmic resistance 59 and the transformer secondary 63. The two transformer secondaries have a common primary winding 57 which is connected to the alternating current energy supply circuit. Thus the wires 55 and 56 are coupled with the alternating current supply.

To the output terminals of the amplifier 40 is also connected an automatic complex compensator 41 as in the arrangement shown in Fig. 3 which may be constructed in the same manner as shown and described in my afore-mentioned companion application and which actuates by means of the shafts 55'' and 56'' the slide contact arms 55' and 56' in such a manner that the deflection of the recording device 60 connected to the contact arm 55' is a measure of the frequency and the deflection of the recording device 61 connected to the contact arm 56' is a measure of the voltage of the alternating current flowing in the supply circuit 1.

I claim as my invention:

1. An arrangement for simultaneously transmitting the values of two independently variable quantities over a common conductor line, including means at the transmitting point, respectively responsive to the variations of said quantities, for producing two alternating current voltages relatively shifted 90° in phase and of values representing respectively a measure of said quantities, means for vectorially adding said voltages and for transmitting their resultant sum through said line, means at the receiving point for vectorially dissolving said resulting voltage into said two 90° phase-shifted original voltage values, and means responsive to said individual voltages for reproducing the measure of the values of said voltages as a measure of the appertaining quantities.

2. An arrangement for simultaneously transmitting the values of two independently variable quantities over a common conductor line, including means at the transmitting point, respectively responsive to the variations of said quantities, for producing two alternating current voltages relatively shifted 90° in phase and of values representing respectively a measure of said quantities, means for vectorially adding said voltages and for transmitting their resultant sum through said line, and an automatic complex compensator at the receiving point for receiving said resulting voltage and for vectorially dissolving it into said two 90° phase-shifted voltages and for reproducing the measure of said individual voltages as a measure of the appertaining quantities.

3. An arrangement for simultaneously transmitting the values of two independently variable quantities over a common conductor line, including at the transmitting point a bridge connection containing in at least one of its branches an ohmic impedance and a reactance connected in parallel to said ohmic impedance, said two impedances being respectively responsive to the variations of said quantities, an alternating current source for supplying energy to said bridge to produce in said one branch voltages relatively shifted 90° in phase and commensurate in value respectively with the values of said quantities, a line connection between the diagonal points of said bridge and the receiving point, for transmitting the vectorial sum of said voltages flowing in the diagonal branch, means at the receiving point for vectorially dissolving said vectorial sum into its component 90° shifted original voltage values, and means at said point connected to the same alternating current source and responsive to said individual voltages for reproducing the measure of the values of said voltages as a measure of the appertaining quantities.

4. An arrangement for simultaneously transmitting the values of two independently variable quantities over a common conductor line, including at the transmitting point a bridge connection containing an ohmic impedance in one of its branches and a reactance in another of its branches, said two impedances being respectively responsive to the variations of said quantities, an alternating current source for supplying energy to said bridge to produce in said two branches voltages relatively shifted 90° in phase and commensurate in value respectively with the values of said quantities, a line connection between the diagonal points of said bridge and the receiving point, for transmitting the vectorial sum of said voltages flowing in the diagonal branch, means at the receiving point for vectorially dissolving said vectorial sum into its component 90° shifted original voltage values, and means at said point connected to the same alternating current source and responsive to said individual voltages for reproducing the measure of the values of said voltages as a measure of the appertaining quantities.

5. An arrangement for simultaneously transmitting through a common conductor line two angular displacements as independently variable quantities, including at the transmitting point two magnetic fields generated by two alternating currents 90° out of phase, a movable coil in each field, each coil being movably responsive to one of the angularly varying quantities, an amplifier at the receiving point and a complex compensator connected to the output side of said amplifier, said two coils being connected through said line in series with the input side of said amplifier to produce in said compensator angular displacements corresponding respectively to their own angular displacements as a measure of the angular displacements of said quantities.

6. An arrangement for simultaneously transmitting the values of two independently variable quantities over a common conductor line, including means at the transmitting point, respectively responsive to the variations of said quantities, for producing two alternating current voltages relatively shifted 90° in phase and of values representing respectively a measure of said quantities, means for vectorially adding said voltages and for transmitting their resultant sum through said line, an amplifier for amplifying said resultant sum, and an automatic complex compensator at the receiving point for receiving said amplified resulting voltage and for vectorially dissolving it into said two 90° phase-shifted voltages and for reproducing the measure of said individual voltages as a measure of the appertaining quantities.

7. An arrangement for simultaneously transmitting through a common transmitting means two angular displacements as independently varying quantities, including at the transmitting point two variable inductive impedances and means for supplying two alternating currents of 90° phase difference respectively to said impedances to produce two voltages 90° out of phase, each of said impedances being disposed to vary in accordance with one of said angularly varying quantities, an amplifier at the receiving point and a complex compensator connected to the output end of said amplifier, said two impedances being connected through said transmitting means in series with the input end of said amplifier to produce in the compensator angular displacements corresponding respectively to their own angular displacements as a measure of the angular displacements of said quantities.

8. An arrangement for simultaneously transmitting through a common transmitting means two independently varying quantities, comprising at the transmitting point two separate alternating current bridge connections coupled with the same alternating current supply, each bridge being responsive to the variation of one of said quantities, said bridges being so designed that the currents flowing in the diagonals of said bridges are relatively 90° out of phase, an amplifier at the receiving point, an automatic complex compensator connected to the output side of said amplifier, the diagonals of said bridges being connected in series with the input side of said amplifier to produce in the compensator angular displacements corresponding respectively to said two independently varying quantities.

WILHELM GEYGER.